(12) United States Patent
Prenner et al.

(10) Patent No.: US 10,737,910 B2
(45) Date of Patent: Aug. 11, 2020

(54) PERSON-TRANSPORTING APPARATUS HAVING A SPEED-MEASURING DEVICE

(71) Applicant: Inventio AG, Hergiswil (CH)

(72) Inventors: Alexander Prenner, Pöttsching (AT); Gerhard Kleewein, Pressbaum (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 16/469,499

(22) PCT Filed: Dec. 1, 2017

(86) PCT No.: PCT/EP2017/081093
§ 371 (c)(1),
(2) Date: Jun. 13, 2019

(87) PCT Pub. No.: WO2018/108560
PCT Pub. Date: Jun. 21, 2018

(65) Prior Publication Data
US 2019/0352139 A1  Nov. 21, 2019

(30) Foreign Application Priority Data

Dec. 16, 2016 (EP) ...................................... 16204592

(51) Int. Cl.
*B66B 25/00* (2006.01)
*B66B 23/02* (2006.01)
(Continued)

(52) U.S. Cl.
CPC ............. *B66B 25/00* (2013.01); *B66B 23/02* (2013.01); *F16H 7/06* (2013.01); *B66B 23/10* (2013.01)

(58) Field of Classification Search
None
See application file for complete search history.

(56) References Cited

U.S. PATENT DOCUMENTS 5,180,341 A * 1/1993 Vahabzadeh ............ F16G 13/04
474/111
6,267,219 B1 * 7/2001 Spannhake ............. B66B 27/00
198/323

(Continued)

FOREIGN PATENT DOCUMENTS

CN   1036236 A   10/1989
CN   1652993 A    8/2005
(Continued)

OTHER PUBLICATIONS

International Search Report for International Application No. PCT/EP2017/081093 dated Apr. 20, 2018.

*Primary Examiner* — Kavel Singh
(74) *Attorney, Agent, or Firm* — Knobbe Martens Olson & Bear LLP

(57) ABSTRACT

The application relates to a passenger transport apparatus comprising at least one drive sprocket for driving and deflecting a conveyor belt, and at least one detecting apparatus for detecting the rotational speed of the drive sprocket. Slot-shaped recesses are arranged on at least one annular side surface of the drive sprocket, wherein the longitudinal extension of the slot-shaped recesses extends in the radial direction with respect to the rotational center of the drive sprocket over the annular side surface. The detecting apparatus makes it possible to generate a signal that represents the rotational speed of the drive sprocket, by means of scanning of the slot-shaped recesses—which can move relative to the detecting apparatus—and the elevations present between the slot-shaped recesses.

18 Claims, 3 Drawing Sheets

(51) Int. Cl.
*F16H 7/06* (2006.01)
*B66B 23/10* (2006.01)

(56) References Cited

U.S. PATENT DOCUMENTS

| | | | |
|---|---|---|---|
| 6,997,302 B2 * | 2/2006 | Fargo | ............... B66B 23/02 |
| | | | 198/323 |
| 7,296,671 B2 | 11/2007 | Pietz | |
| 2007/0012547 A1 | 1/2007 | Depaso | |
| 2017/0012547 A1 | 1/2017 | Jitaru | |
| 2018/0123514 A1 | 5/2018 | Yong et al. | |

FOREIGN PATENT DOCUMENTS

| | | |
|---|---|---|
| CN | 202609747 U | 12/2012 |
| CN | 202936049 U | 5/2013 |
| CN | 203558695 U | 4/2014 |
| CN | 203653034 U | 6/2014 |
| CN | 105810457 A | 7/2016 |
| EP | 3026001 A1 | 6/2016 |
| JP | 4116073 | 7/2008 |
| TW | I237029 | 8/2005 |
| TW | I554465 | 10/2016 |
| WO | WO0218259 A1 | 3/2002 |
| WO | WO2016069734 A1 | 5/2016 |

* cited by examiner

PERSON-TRANSPORTING APPARATUS HAVING A SPEED-MEASURING DEVICE

TECHNICAL FIELD

The disclosure relates to a passenger transport apparatus that is configured as an escalator or moving walkway. The passenger transport apparatus comprises at least one drive sprocket for driving and deflecting a conveyor belt, as well as at least one detecting apparatus for detecting the rotational speed of the drive sprocket.

SUMMARY

Passenger transport apparatuses of the aforementioned type are known, for example, from CN 202609747 U. Two sensors oriented toward the teeth/tooth spaces of the drive sprocket and that scan the same contactlessly are provided in order to detect the rotational speed and direction of rotation of the drive sprocket. From the scanning signals of the two sensors, it is possible to detect the direction of rotation and the rotational speed of the drive sprocket, or the circumferential speed thereof and directly therewith the transport belt speed of the escalator or moving walkway. A particular advantage of this solution over, for example, incremental encoders coupled to the drive sprocket lies in being especially cost-effective, since no additional parts—such as coupling elements and moving parts for transmitting the rotary motion—are needed beyond the sensors and fastening means therefor. This solution has a disadvantage, however, in the exposed location of the sensors with regard to lubricant of the drive chain adjacent to the drive sprocket, and, in particular, from metallic abrasion caused by wear between the drive chain and the drive sprocket. This abrasion can stick together with dust, dirt, and lubricants onto the sensor heads and cause incorrect signals.

The present disclosure addresses the problem of providing a detecting apparatus that enables cost-effective, yet also reliable and unencumbered detection of the rotational speed of the drive sprocket.

This problem can be solved by a passenger transport apparatus configured as an escalator or moving walkway. The passenger transport apparatus can comprise at least one drive sprocket for driving and deflecting a conveyor belt, as well as at least one detecting apparatus for detecting the rotational speed of the drive sprocket. Slot-shaped recesses can be arranged on at least one annular side surface of the drive sprocket, wherein the longitudinal extension of the slot-shaped recesses extends in the radial direction with respect to the rotational center of the drive sprocket at least partially over the annular side surface. The detecting apparatus can make it possible to generate a signal that represents the rotational speed of the drive sprocket, by means of scanning of the slot-shaped recesses and the elevations present between the recesses, being moveable arranged relative to the detecting apparatus. As soon as the drive sprocket rotates, the slot-shaped recesses and the elevations move past the detecting apparatus/past the at least one sensor thereof, so that the sensor emits substantially a rectangular or wave-shaped signal waveform. The speed can be calculated in a signal processing unit from the amplitude width of the signal waveform, and these speed values are transmitted to the controller of the passenger transport apparatus.

The slot-shaped recesses/elevations arranged on the annular side surface can enable a substantially more unencumbered operation than when the teeth of the drive sprocket are scanned. On the one hand, the arrangement on the annual side surface leads to the at least one sensor of the detecting apparatus no longer being directly exposed to the lubricant and metal abrasion of the drive chain On the other hand, however, it has been shown that the radial arrangement of the slot-shaped recesses or the web-shaped, rib-shaped, or lamellar elevations formed thereby produces a cleaning effect on the sensor head when the drive sprocket turns. This cleaning effect is due to the air flow prevailing in the slot-shaped recesses. Due to the flow of air, dust and dirt are released from the sensor head and transported out of the detection range of the sensor, with the help of the centrifugal force.

The greater the relative speed between the sensor head and the slot-shaped recesses, the stronger the flow of air. Advantageously, therefore, the annular side surface is arranged as close as possible to the outermost diameter of the drive sprocket.

Preferably all of the slot-shaped recesses have the same slot shape, in order to obtain the most regular possible signal waveform.

In order to increase the cleaning effect, the slot-shaped recesses may have a flow-optimized cross-section over the entire longitudinal extension thereof, due to surface transitions of the slot-shaped recesses being provided with curves. Depending on the design, the air either circulates within the slot-shaped recesses or flows through the slot-shaped recesses in the radial direction, or from the inner diameter of the annular side surface to the outer diameter of the annular side surface.

The actual dimensions of the slot-shaped recesses or of the elevations formed thereby, too, may be attribute to a cleaning effect. Preferably, the slot-shaped recesses have a slot width of 3 to 10 mm, a slot length of 25 to 60 mm, and a slot depth of 5 to 15 mm.

The slot-shaped recesses may be produced, for example, by means of machining processing such as, for example, by milling in the annular side surface. The slot-shaped recesses may, however, also be formed through, for example, a casting or forging process by a plurality of lamellae that are arranged on the annular side surface and serve as elevations.

The elevations may have, for example, a width of 3 to 20 mm, a length of 25 to 60 mm, and a depth of 5 to 15 mm.

Preferably all of the elevations have the same shape or design, in order to obtain the most regular possible signal waveform. Where not only the rotational speed of the drive sprocket but also the direction of rotation is to be determined, then two sensors are required if identical slot-shaped recesses and identical elevations are used. These are arranged relative to one another so that the distance therebetween is not equal to the spacing—or a plurality of spacings—of slot-shaped recesses and elevations. This means that in a certain position of the drive sprocket relative to the detecting apparatus, the first sensor head is directed precisely between two elevations in the middle of the slot-shaped recesses therebetween, whereas the second sensor is directed to the edge that delimits the slot-shaped recess of the adjoining elevation.

There is, however, also the possibility of detecting the speed and the direction of rotation with only one sensor. Herein, the elevations are preferably divided into three groups with different widths. The elevations of different widths are arranged so as to alternate on the annular side surface, one elevation of the first width being arranged so as to be followed by one elevation of the second width, followed by one elevation of the third width—and so forth—on the drive sprocket. The signal waveform resulting from the measurement now has different amplitude widths, so that the direction of rotation and the current rotational speed can be calculated from the signal waveform after a series of three elevations has been detected. Therein, the width difference of the elevations must be selected such that at maximum acceleration or deceleration of the rotational speed of the drive sprocket, the detected width of the subsequent elevation does not undershoot the width of the preceding elevation, such that an incorrect direction of rotation would be determined.

In another embodiment, the drive sprocket has a disk-shaped wheel body and an outer ring protruding in the axial direction from the disk-shaped wheel body. The elevations of the annular side surface may be arranged in order to reinforce the transition between the outer ring and the wheel body. The arrangement of the elevations as reinforcing ribs in the transition additionally protects the same against lubricants, dust, fouling, and metal abrasion particles.

The outer ring is able to absorb considerable loads due to the transition between the outer ring and the wheel body, having been reinforced by the elevations yet also favorably designed for the distribution of forces in the drive sprocket. Preferably, therefore, a toothed structure for engaging with a drive chain is configured circumferentially on the outer ring.

Such a drive sprocket may be produced, for example, by means of a casting process, wherein the elevations are integrally cast therewith. Because the cast surface is usually somewhat rough, especially with sand casting, this irregular cast surface may lead to disturbing effects in the scanning. Preferably, therefore, the elevations are processed in parallel to the annular side surface by means of a machining process.

In order to optimize the flow effect and thus the cleaning effect, at least one flow guide member may be present, the flow guide member partially covering the slot-shaped recesses present in the region thereof and thereby forming ventilation channels. The flow guide member may additionally serve as a holder, or receptacle, for the sensors of the detecting apparatus.

The detecting apparatus can include at least one sensor, the signal of which can be transmitted directly or after having been processed to a controller of the passenger transport apparatus. This means that either the raw signals of the sensor are transmitted to the controller and then are processed and assessed in an arithmetic unit of the controller, or the sensor used has its own arithmetic unit, which calculates the speed information and/or rotational direction information from the captured raw signal, and transmits this information/data continuously or sequentially to the controller.

The detecting apparatus preferably comprises an interface to a bus node of a bus system of the passenger transport apparatus. This bus system is connected to the controller of the passenger transport apparatus, so that the signals and/or data of the detecting apparatus can be transmitted to the controller via this bus system.

It should be noted that some of the possible features and advantages of the invention(s) are described here with reference to different embodiments. A person skilled in the art recognizes that the features may be combined, adapted, or exchanged as appropriate in order to yield other embodiments of the present invention(s).

BRIEF DESCRIPTION OF THE DRAWINGS

Embodiments of the present disclosure are described below with reference to the accompanying drawings, wherein neither the drawings nor the description are to be interpreted as limiting.

The drawings are only schematic and are not true to scale. Like reference signs refer in different drawings to like or analogous features.

DETAILED DESCRIPTION

Figure 1:
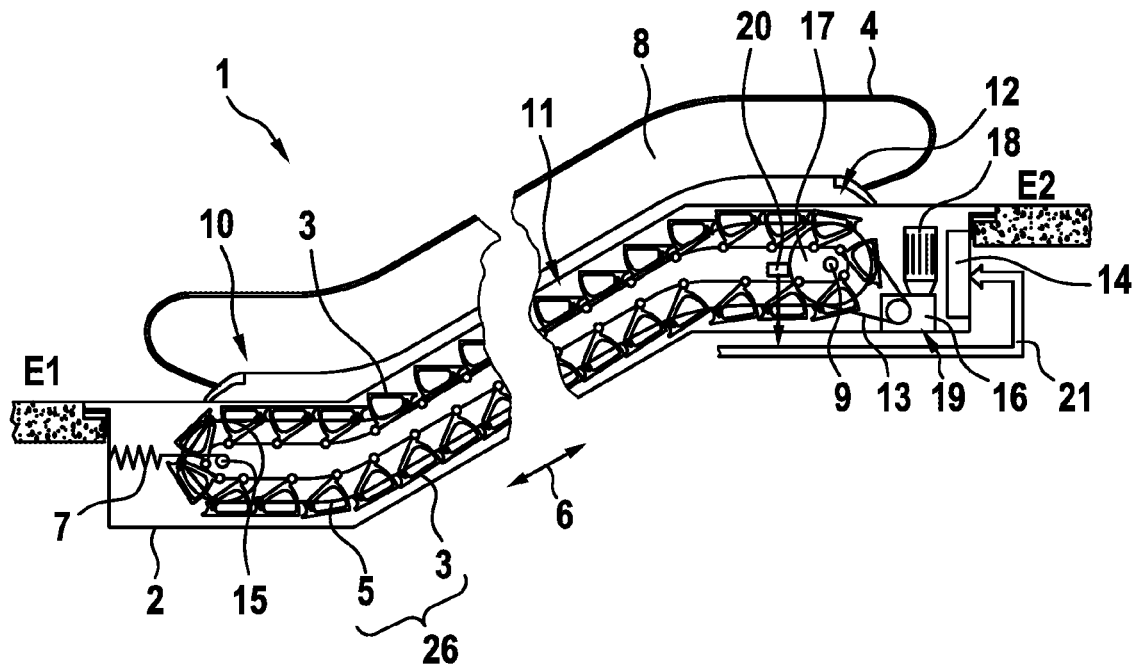
FIG. 1 shows a schematic overview of an escalator.

FIG. 1 illustrates a passenger transport apparatus 1, designed by way of example as an escalator 1, which can be used to convey people, for example, between two levels E1, E2. It shall be readily understood that the present disclosure may also be used in a moving walkway 1.

The passenger transport apparatus 1 comprises a conveyor belt 26 having a plurality of steps 3 that are arranged consecutively and can be displaced in opposite directions of movement 6 along a travel path with the aid of two closed-loop conveyor chains 5 (only one being visible in FIG. 1) that are parallel to one another in the horizontal direction. Each step 3 is then fastened near each of the lateral ends thereof to one of the conveyor chains 5. In order to be able to displace the conveyor chains 5, the passenger transport apparatus 1 has a drive assembly 19 (indicated only schematically in FIG. 1), having at least one driven drive sprocket 17 (only one being visible in FIG. 1). The drive assembly is usually arranged in the upper level E2, whereas a tensioning station 7 (depicted only schematically) having the reversing sprockets 15 (only one being visible in FIG. 1) is arranged in the lower level E1. The drive and reversing sprockets 15, 17 and other load-bearing components of the escalator 1 are held on a load-bearing structure 2, most often in the form of a framework structure, which is depicted only as an outline for reasons of clarity in FIG. 1. The escalator 1 also has two balustrades 8 (only one being visible), on each of which a handrail 4 is arranged continuously.

The steps 3 are, in an upwardly-conveying activity, moved in forward travel from a lower, horizontally-running region 10 adjoining the lower level E1, over a middle, inclined region 11 to an upper, horizontally-running region 12 adjoining the upper level E2, and then moved back in the opposite direction in the return travel.

The drive unit 19 has a drive motor 18 that is controlled and regulated by means of a controller 14. The torque or the rotational movement of the motor shaft (covered by the transmission) of the drive motor 18 is transmitted to the drive sprocket 17 via a transmission 16 and a drive chain 13. Since usually two conveyor chains 5 between which the steps 3 are arranged are present, two drive sprockets 17 must also be present. These are connected to one another by means of a drive shaft 9.

Furthermore, the passenger transport apparatus 1 is equipped with a detecting apparatus 20 for detecting at least the rotational speed of the drive sprocket 17. The detecting apparatus 20 is connected to the controller 14 via a bus system 21.

Figure 2:
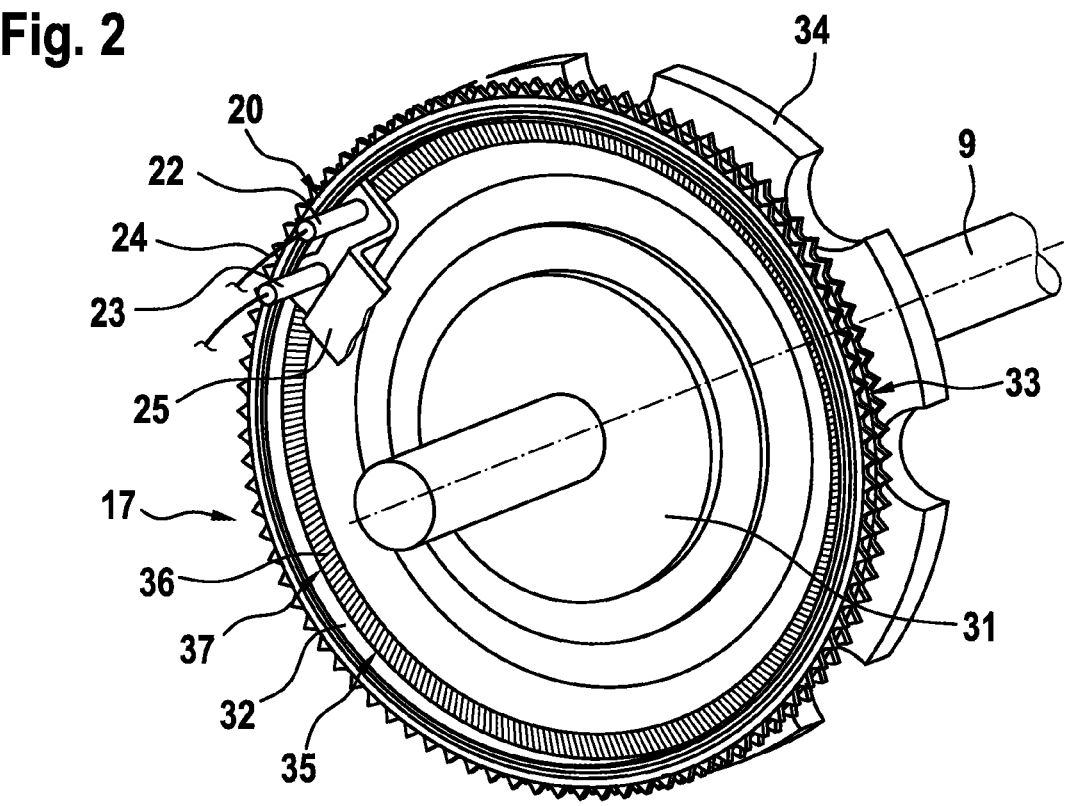
FIG. 2 illustrates a three-dimensional view of the drive sprocket from FIG. 1, as well as one possible arrangement of the detecting apparatus.

FIG. 2 illustrates a three-dimensional view of the drive sprocket 17 from FIG. 1, as well as one possible arrangement of the detecting apparatus 20. The drive sprocket 17 has a disk-shaped wheel body 31 and an outer ring 32 protruding in the axial direction from the disk-shaped wheel body 31. A toothed structure 33 for engaging with the drive chain 13 depicted in FIG. 1 is configured circumferentially on the outer ring 32. Furthermore, the drive sprocket 17 has a conveyor chain toothed structure 34 for take-up and deflection of the conveyor chain 5.

Slot-shaped recesses 37 are arranged on an annular side surface 35 of the drive sprocket 17 or of the disk-shaped wheel body 31, wherein the longitudinal extension of the slot-shaped recesses 37 extends in the radial direction with respect to the rotational center of the drive sprocket 17 or the axis of rotation of the drive shaft 9 over the annular side surface 35. Elevations 36 are present between the slot-shaped recesses 37.

The elevations 36 of the annular side surface 35 are arranged in order to reinforce the transition between the outer ring 32 and the wheel body 31. The arrangement of the elevations 36 as reinforcing ribs in the transition additionally protects the same against lubricants, dust, fouling, and metal abrasion particles.

The detecting apparatus 20 has a holder 25 in which two sensors 22, 23 are arranged. These sensors 22, 23 may be optical sensors, inductive sensors, or the like. Basically, the principle of detection according to which the sensors 22, 23 work does not matter. They need only be able to differentiate the slot-shaped recesses 37 from the elevations 36 therebetween, and detect the relative motion thereof relative to the sensor 22, 23, when the drive sprocket 17 turns. Furthermore, how the acquired raw signal of the sensors 22, 23 is prepared and processed also does not matter for the present invention. Through the detection and processing it must be possible to determine at least the current rotational speed of the drive sprocket 17, optionally also changes in the rotational speed, and the direction of rotation of the drive sprocket 17, and to supply the same to the controller 14 via signal lines 24, the above-mentioned bus system 21, or wirelessly.

Figure 3:
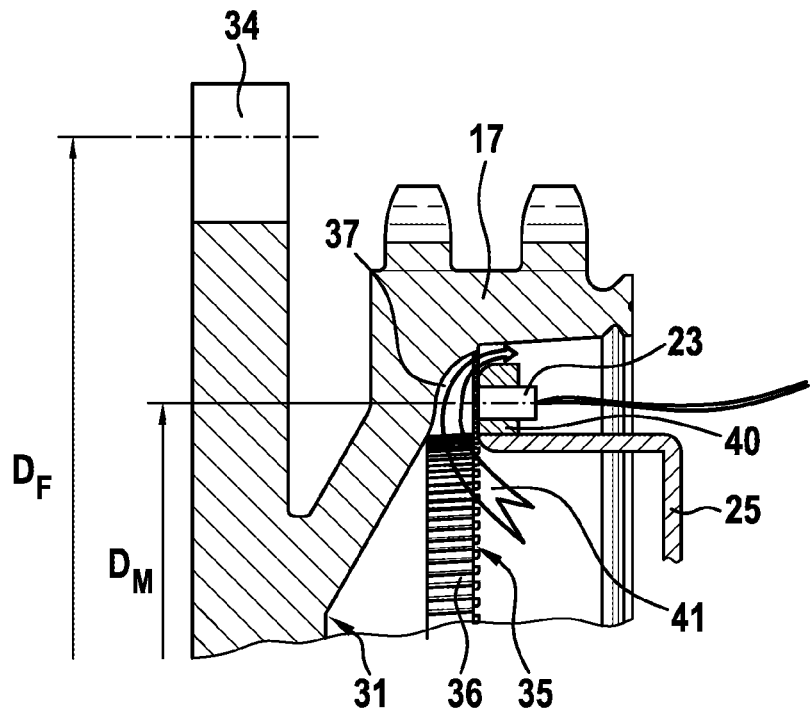
FIG. 3 illustrates a cut representation of the first possible design of the slot-shaped recesses and the elevations present therebetween already shown in FIG. 2.

FIG. 3 illustrates a cut representation of the first possible design of the slot-shaped recesses 37 (already visible in FIG. 2) and the elevations 36 of the drive sprocket 17 that are present therebetween. It is apparent from FIG. 3 that the pitch diameter $D_F$ of the conveyor chain toothed structure 34 corresponds approximately to the mean diameter $D_M$ of the annular side surface 35 and thus to the detection circuit of the sensor 23. Due to this very direct examination, high-precision speed information/the associated sensor signal can be transmitted to the controller 14 without the sensor signal being affected by elasticities and vibrations.

FIG. 3 also illustrates the interaction of the slot-shaped recesses 37, the elevations 36, and a flow guide member 40, wherein the flow guide member 40 is part of the holder 25. The holder 25 is fixedly mounted so that the elevations 36 and slot-shaped recesses 37 pass by the holder 25 when the drive sprocket 17 turns. They are then captured by the head of the sensor 23. The side of the holder 25/flow guide member 40 that faces the elevations 36 is arranged just above the elevations 36, and forms ventilation channels together with the slot-shaped recesses 37. When the sprocket 17 turns, the elevations 36 push air 41 through the ventilation channels, in a manner equivalent to a radial compressor. This flow of air 41 automatically cleans the slot-shaped recess 37, as well as the heads of the sensors 22, 23 that are inserted in the holder 25 or in the flow body 40. Both the flow guide member 40 and the slot-shaped recesses 37 are configured for optimum flow. As can be seen in FIG. 3, the elevations 36 have been processed in parallel to the annular side surface 35, or to a vertical plane of the wheel body 31, by means of a machining process in order to minimize ventilation losses.

In the present embodiment of FIGS. 2 and 3, not only the rotational speed of the drive sprocket 17 but also the direction of rotation thereof shall be determined. Because identical slot-shaped recesses 37 and identical elevations 36 are used, two sensors 22, 23 are required. These are arranged relative to one another so that the distance therebetween is not equal to the spacing—or a plurality of spacings—of the slot-shaped recesses 37 and elevations 36. This means that in a certain position of the drive sprocket 17 relative to the detecting apparatus 20, the head of the first sensor 22 is directed precisely between two elevations 36 in the middle of the slot-shaped recesses 37 therebetween, whereas the head of the second sensor 23 is directed to the edge extending in the radial direction that delimits the slot-shaped recess 37 of the adjoining elevation 36. The signal waveforms captured by the sensors 22, 23 have, due thereto, a phase shift of the amplitudes thereof to one another, so that the direction of rotation can be determined from this phase shift.

Figure 4:
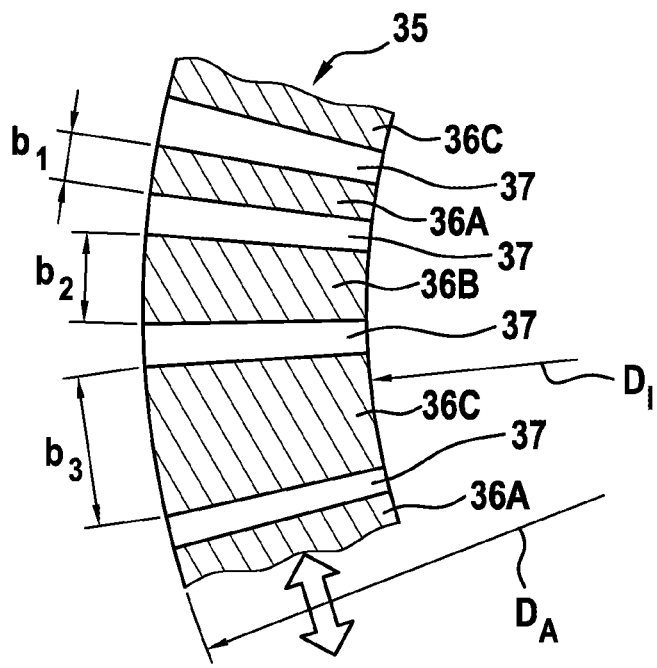
FIG. 4 illustrates a second possible design of the slot-shaped recesses and the elevations therebetween.

FIG. 4 illustrates a second possible design of the slot-shaped recesses 37 and the elevations 36 therebetween. Only one segment of the annular side surface 35 is depicted. For the purpose of a better overview, the elevations 36 are depicted in cross-section, and are provided with reference signs supplemented alphanumerically for purposes of differentiation. This second design differs only slightly from the first design. It differs only in the design of the elevations 36A, 36, 36C—in the present embodiment, in the widths $b_1$, $b_2$, $b_3$ thereof. The slot-shaped recesses 37 arranged between the elevations 36A, 36B, 36C are all identical. Because the elevations 36A, 36B, 36C and slot-shaped recesses 37 extend in the radial direction, they have a greater width at the outer diameter $D_A$ of the annular side surface 35 than at the inner diameter $D_I$ of the annular side surface 35. The position of the width indication in FIG. 4 is therefore to be understood to only be an example. It shall be readily understood that more than only three groups of different elevations 36A, 36B, 36C may also be present.

The sequence of the elevations 36A, 36B, 36C of three different widths is also depicted by way of example. This sequence is repeated over the entire annular side surface 35. It shall be readily understood that instead of the elevations 36, the slot-shaped recesses 37 may have different widths. Another possibility would be for both the elevations 36 and the slot-shaped recesses 37 to have a sequence of difference widths. Through the different widths, the sensor 22 can record a signal waveform with distinct amplitude widths. The direction of rotation can be determined from the sequence of different amplitude widths. As a result, only one sensor 22 is necessary.

Figure 5:
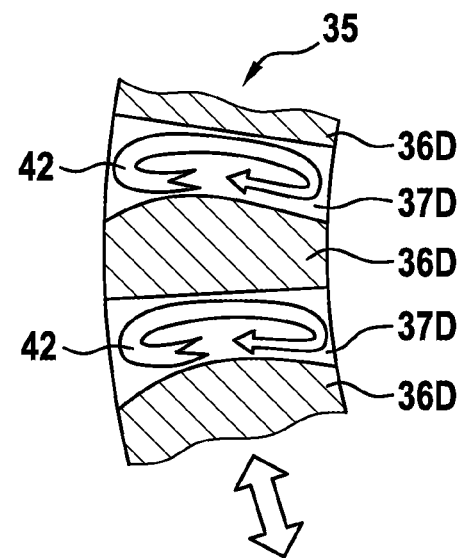
FIG. 5 illustrates a third possible design of the slot-shaped recesses and the elevations therebetween.

FIG. 5 illustrates a third possible design of the slot-shaped recesses 37D specially configured on the annular side surface 35, and the elevations 36D therebetween. Again, only one segment of the annular side surface 35 is depicted. As in FIG. 4, FIG. 5 also depicts the elevations 36D in cross-section, for the purpose of a better overview. The special shaping of the slot-shaped recesses 37D allows for a vortex-shaped flow of air 42 to be produced therewithin. This vortex-shaped flow of air 42 also transports dust and fouling away from the slot-shaped recesses 37D.

Although the invention(s) has been described through the depiction of specific embodiments, it is evident that numerous other embodiment variants can be created with the knowledge of the present invention(s), for example, by providing the elevations with additional elements such as pattern barcodes, matrix codes, color elements, or the like that can additionally be detected by the at least one sensor. Furthermore, a large number of flow guide members are possible, as are a large number of other designs for flow-optimized slot-shaped recesses.

The invention claimed is:

1. A passenger transport apparatus configured as an escalator or moving walkway, the passenger transport apparatus comprising:
    at least one drive sprocket configured to drive and deflect a conveyor belt, the at least one drive sprocket comprising a plurality of slot-shaped recesses are arranged on at least one annular side surface of the drive sprocket, wherein a longitudinal extension of the slot-shaped recesses extends in a radial direction with respect to the rotational center of the drive sprocket at least partially over the annular side surface; and
    at least one detecting apparatus configured to scan the plurality of slot-shaped recesses as the at least one drive socket rotates to detect the rotational speed of the drive sprocket,
    wherein by scanning the slot-shaped recesses, the detecting apparatus generates a signal that represents the rotational speed of the drive socket.

2. The passenger transport apparatus of claim 1, wherein all the slot-shaped recesses have the same slot shape.

3. The passenger transport apparatus of claim 1, wherein the slot-shaped recesses comprise curves at the surface transitions thereof configured to provide a flow-optimized cross-section over the entire longitudinal extension thereof of the slot-shaped recesses.

4. The passenger transport apparatus of claim 1, wherein the slot-shaped recesses have a slot width of 3 to 10 mm, a slot length of 25 to 60 mm, and a slot depth of 5 to 15 mm.

5. The passenger transport apparatus of claim 1, wherein the slot-shaped recesses are formed by a plurality of elevations arranged on the annular side surface.

6. The passenger transport apparatus of claim 5, wherein the elevations have a width of 3 to 20 mm, a length of 25 to 60 mm, and a depth of 5 to 15 mm.

7. The passenger transport apparatus of claim 5, wherein all the elevations have the same shape.

8. The passenger transport apparatus of claim 5, wherein the elevations are divided into three groups with different widths, wherein, alternating respectively, an elevation of the first width is arranged to be followed by an elevation of the second width and an elevation of the third width on the drive sprocket.

9. The passenger transport apparatus of claim 5, wherein the drive sprocket comprises a disk-shaped wheel body and an outer ring protruding in the axial direction from the disk-shaped wheel body, wherein the elevations are configured to reinforce the transition area between the outer ring and the disk-shaped wheel body.

10. The passenger transport apparatus of claim 9, wherein a toothed structure for engaging with a drive chain is configured circumferentially on the outer ring.

11. The passenger transport apparatus of claim 5, wherein the elevations are integrally formed with the drive socket.

12. The passenger transport apparatus of claim 11, wherein the elevations are processed in parallel on the annular side surface using a machining process.

13. The passenger transport apparatus of any of claim 1, further comprising at least one flow guide member partially covering the slot-shaped recesses present in the region thereof and thereby forming ventilation channels therewith.

14. The passenger transport apparatus of claim 1, wherein the detecting apparatus includes at least one sensor, the signal of which can be transmitted directly or after having been processed to a controller of the passenger transport apparatus.

15. The passenger transport apparatus of claim 14, wherein the detecting apparatus comprises an interface to a bus node of a bus system of the passenger transport apparatus, which bus system is connected to the controller of the passenger transport apparatus.

16. The passenger transport apparatus of claim 2, wherein the slot-shaped recesses comprise curves at the surface transitions thereof configured to provide a flow-optimized cross-section over the entire longitudinal extension thereof of the slot-shaped recesses.

17. The passenger transport apparatus of claim 3, wherein the slot-shaped recesses have a slot width of 3 to 10 mm, a slot length of 25 to 60 mm, and a slot depth of 5 to 15 mm.

18. The passenger transport apparatus of claim 5, wherein the slot-shaped recesses are formed by a plurality of elevations arranged on the annular side surface.

* * * * *